United States Patent
Freeman

(10) Patent No.: US 9,607,370 B2
(45) Date of Patent: Mar. 28, 2017

(54) SYSTEM AND METHODS OF INSPECTING AN OBJECT

(71) Applicant: THE BOEING COMPANY, Seal Beach, CA (US)

(72) Inventor: Philip L. Freeman, Summerville, SC (US)

(73) Assignee: The Boeing Company, Chicago, IL (US)

(*) Notice: Subject to any disclaimer, the term of this patent is extended or adjusted under 35 U.S.C. 154(b) by 545 days.

(21) Appl. No.: 14/156,019

(22) Filed: Jan. 15, 2014

(65) Prior Publication Data
US 2015/0199802 A1    Jul. 16, 2015

(51) Int. Cl.
*G06T 17/00*   (2006.01)
*G06T 7/00*    (2017.01)
*H04N 5/232*   (2006.01)

(52) U.S. Cl.
CPC ......... *G06T 7/001* (2013.01); *H04N 5/23229* (2013.01); *G06T 2200/08* (2013.01); *G06T 2207/10028* (2013.01); *G06T 2207/30164* (2013.01)

(58) Field of Classification Search
CPC ........... G06T 7/001; G06T 2207/30108; G06T 17/00; G06T 2200/08; G06T 15/00; G06T 19/00; H04N 5/23229
USPC ....................................................... 348/129
See application file for complete search history.

(56) References Cited

U.S. PATENT DOCUMENTS

| | | |
|---|---|---|
| 5,809,171 A | 9/1998 | Neff et al. |
| 5,890,808 A | 4/1999 | Neff et al. |
| 5,946,422 A | 8/1999 | Neff et al. |
| 5,982,930 A | 11/1999 | Neff et al. |
| 5,982,945 A | 11/1999 | Neff et al. |

(Continued)

FOREIGN PATENT DOCUMENTS

| | | | |
|---|---|---|---|
| CN | 10566461 B | * | 11/2010 |
| JP | 2013-186100 | * | 9/2013 |

OTHER PUBLICATIONS

Tanichuchi et al, Machine generated translation of JP 2013-186100, Sep. 2013.*

(Continued)

*Primary Examiner* — David Harvey
(74) *Attorney, Agent, or Firm* — Armstrong Teasdale LLP

(57) ABSTRACT

A system for use in inspecting an object is provided. The system includes at least one array of visual imaging devices configured to capture a plurality of two-dimensional images of the object. The array is configured to capture a first set of two-dimensional images over a first predetermined interval and a second set of two-dimensional images over a second predetermined interval that is after the first predetermined interval. The system also includes a computing device coupled to the at least one array of visual imaging devices. The computing device is configured to extract point clouds of the object from the first and second sets of two-dimensional images, generate a three-dimensional model of the object from the extracted point clouds, determine variations in the extracted point clouds from the first and second sets of two-dimensional images, and utilize the determined variations to detect potential anomalies in the three-dimensional model.

20 Claims, 5 Drawing Sheets

(56) References Cited

U.S. PATENT DOCUMENTS

| | | | |
|---|---|---|---|
| 6,545,676 B1* | 4/2003 | Ryan | G06T 17/20 345/420 |
| 7,702,183 B1 | 4/2010 | Johnson et al. | |
| 9,251,582 B2* | 2/2016 | Lim | G06F 17/30247 |
| 2007/0242280 A1* | 10/2007 | Dickinson | G01B 11/005 356/620 |
| 2009/0160852 A1* | 6/2009 | Chang | G06T 7/0057 345/419 |
| 2010/0194749 A1* | 8/2010 | Nightingale | G01N 23/046 345/424 |
| 2010/0211358 A1 | 8/2010 | Kesler et al. | |
| 2010/0235037 A1 | 9/2010 | Vian et al. | |
| 2010/0316280 A1* | 12/2010 | Lancaster | G06K 9/00214 382/154 |
| 2012/0162372 A1* | 6/2012 | Ghyme | H04N 13/004 348/46 |
| 2012/0177283 A1* | 7/2012 | Wang | G06T 17/00 382/154 |
| 2012/0297600 A1* | 11/2012 | Ullrich | G01B 11/2441 29/407.04 |
| 2013/0155058 A1* | 6/2013 | Golparvar-Fard | G06T 19/006 345/419 |
| 2013/0216089 A1* | 8/2013 | Chen | G06T 7/0002 382/100 |
| 2015/0012171 A1* | 1/2015 | Richter | B64F 5/0045 701/32.9 |
| 2015/0174828 A1* | 6/2015 | Creuzer | B29C 67/0059 264/40.1 |
| 2015/0278992 A1* | 10/2015 | Smits | G02B 27/2235 345/660 |
| 2015/0283654 A1* | 10/2015 | Ernst | B23P 6/002 29/889.1 |
| 2015/0362310 A1* | 12/2015 | Taniguchi | G01B 21/047 356/4.01 |
| 2016/0150217 A1* | 5/2016 | Popov | G06T 15/04 348/48 |
| 2016/0249989 A1* | 9/2016 | Devam | G09B 23/285 345/633 |
| 2016/0341671 A1* | 11/2016 | Maass | G01N 21/8851 |
| 2016/0364007 A1* | 12/2016 | Kamovich | G06F 3/0488 |

OTHER PUBLICATIONS

EP Extended Search Report for related application 14189242 dated Jun. 3, 2015; 10 pp.

Griffa, Alberto; 3-D Point-Cloud Processing for Maintenance, Repair, and Overhaul; available at http://www.qualitydigest.com/inside/cmsc-article/3-d-point-cloud-processing-maintenance-repair-and-overhaul.html; last visited Jun. 19, 2015; 4 pp.

Fritsch, Dieter et al.; Photogrammetric Point Cloud Collection with Multi-camera Systems; EuroMed 2012; Proceedings of the 4th International Conference on Progress in Culteral Heritage Preservation; pp. 11-20.

Faro UK Blog; Nuclear Safety-Remote Deployment of Laser Scanners in Contaminated Environments; available at http://blog-uk.faro.com/2011/09/nuclear-safety-remote-deployment-of-laser-scanners-in-contaminated-environments/; last visited May 21, 2015; 7 pp.

* cited by examiner

SYSTEM AND METHODS OF INSPECTING AN OBJECT

BACKGROUND

The field of the present disclosure relates generally to inspection of an object and, more specifically, to detecting potential anomalies of the object by inspecting a three-dimensional model of the object generated using structure from motion range imaging techniques.

At least some known aircraft require daily inspections to detect potential damage and/or other maintenance issues. Such inspections are typically conducted manually by a maintenance worker or other personnel when the aircraft is not in service. For example, in some instances, the maintenance worker visually inspects the aircraft with the naked eye while physically moving around the aircraft. However, finding and accurately determining locations of potential damage via visual inspection on large commercial aircraft, for example, can be a time-consuming and laborious task susceptible to human error.

Several attempts have been made to automate visual inspection techniques for known aircraft. At least one known method includes capturing two-dimensional images of the aircraft taken at different times, and comparing the images to determine variations therebetween. However, it may be difficult to accurately determine variations between the images when they are taken from different angles and/or distances, for example. Another known method includes capturing a two-dimensional image of the aircraft, and comparing the image to a three-dimensional model of the aircraft. However, the dimensions of the three-dimensional model may be unavailable or inaccurate such that a comparison between the three-dimensional model and the image will result in false detection of anomalies.

BRIEF DESCRIPTION

In one aspect of the disclosure, a system for use in inspecting an object is provided. The system includes at least one array of visual imaging devices configured to capture a plurality of two-dimensional images of the object. The at least one array is configured to capture a first set of two-dimensional images over a first predetermined interval and a second set of two-dimensional images over a second predetermined interval that is after the first predetermined interval. The system also includes a computing device coupled to the at least one array of visual imaging devices. The computing device is configured to extract point clouds of the object from the first and second sets of two-dimensional images, generate a three-dimensional model of the object from the extracted point clouds, determine variations in the extracted point clouds from the first and second sets of two-dimensional images, and utilize the determined variations to detect potential anomalies in the three-dimensional model.

In another aspect of the disclosure, a method of inspecting an object is provided. The method includes capturing a first set of two-dimensional images of the object over a first predetermined interval, capturing a second set of two-dimensional images of the object over a second predetermined interval that is after the first predetermined interval, extracting point clouds of the object from the first and second sets of two-dimensional images, generating a three-dimensional model of the object from the extracted point clouds, determining variations in the extracted point clouds from the first and second sets of two-dimensional images, and utilizing the determined variations to detect potential anomalies in the three-dimensional model.

In yet another aspect of the disclosure, a non-transitory computer-readable storage device having computer-executable instructions embodied thereon for use in inspecting an object is provided. When executed by a computing device, the computer-executable instructions cause the computing device to extract point clouds of the object from a first set and a second set of two-dimensional images of the object taken over separate predetermined intervals, generate a three-dimensional model of the object from the extracted point clouds, determine variations in the extracted point clouds from the first and second sets of two-dimensional images, and utilize the determined variations to detect potential anomalies in the three-dimensional model.

DETAILED DESCRIPTION

The implementations described herein relate to systems and methods of inspecting an object. More specifically, the systems and methods described herein facilitate detecting anomalies of an object by inspecting a three-dimensional (3D) model of the object generated using structure from motion (SfM) range imaging techniques. In the exemplary implementation, the 3D model of the object is generated from first and second sets of two-dimensional (2D) images captured over different predetermined intervals. As such, the 3D model need only be consistent between the first and second sets of 2D images, and not necessarily accurate in comparison to dimensions of the actual object. Variations in the point clouds of the first and second sets of 2D images are determined to detect potential anomalies in the object that may require further inspection. As such, the systems and methods described herein provide a detection technique that facilitates reducing the time required for manual inspection of the object by more accurately determining the presence of potential damage on the object.

Figure 1:
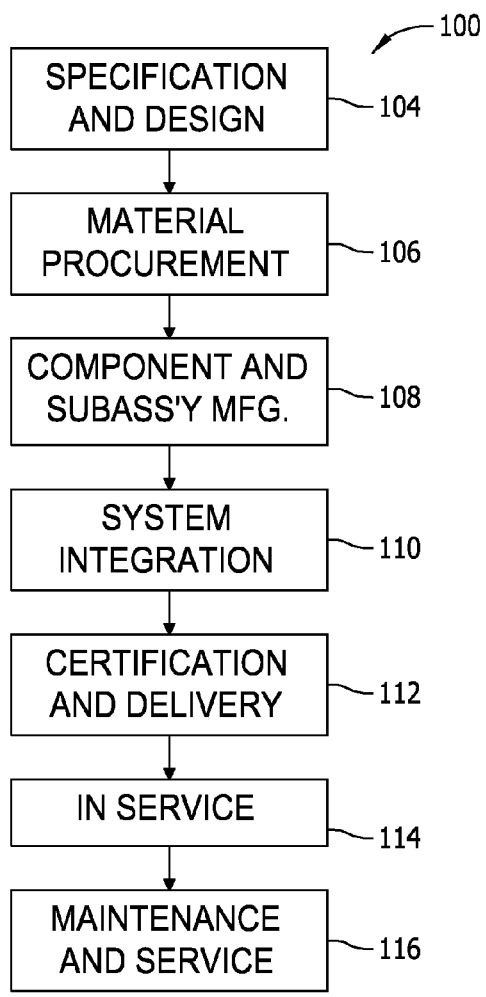
FIG. 1 is a flow diagram of an exemplary aircraft production and service methodology.
Figure 2:
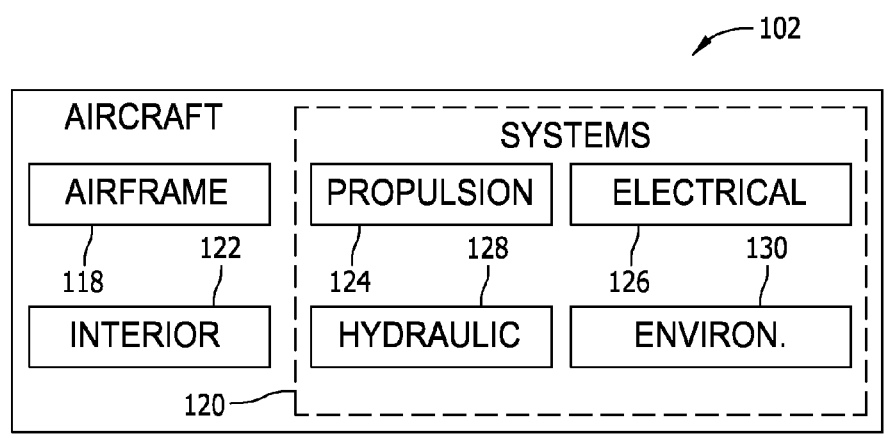
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
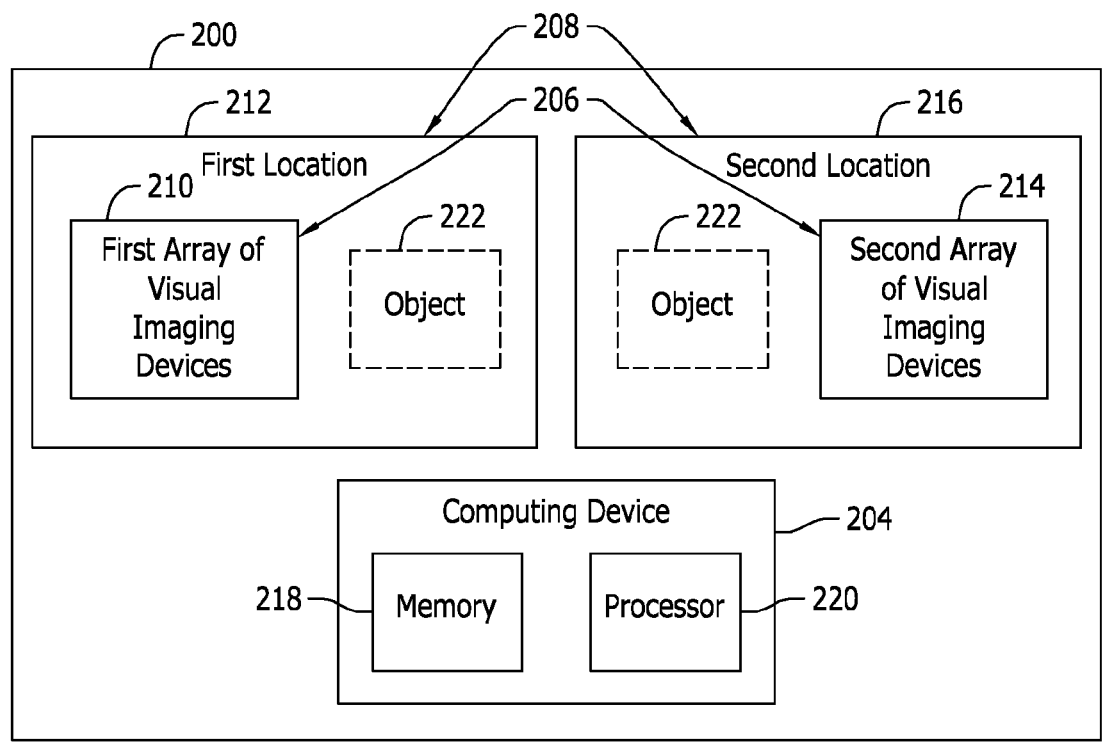
FIG. 3 is a block diagram of an exemplary system for use in inspecting an object.

FIG. 3 is a block diagram of an exemplary system 200 for use in inspecting an object 202. In the exemplary implementation, system 200 includes a computing device 204, and at least one array 206 of visual imaging devices (not shown in FIG. 3) for use in capturing a plurality of two-dimensional (2D) images of object 202 over predetermined intervals at one or more locations 208. More specifically, system 200 includes a first array 210 of visual imaging devices at a first location 212, and a second array 214 of visual imaging devices at a second location 216. Object 202 is selectively moveable between first and second locations 212 and 216. For example, object 202 may be a self-propelled vehicle, such as aircraft 102 (shown in FIG. 2), to enable object 202 to be selectively moveable between first and second locations 212 and 216. Alternatively, object 202 is selectively moveable using any suitable mechanism.

Computing device 204 includes a memory 218 and a processor 220 coupled to memory 218 for executing programmed instructions. Processor 220 may include one or more processing units (e.g., in a multi-core configuration) and/or include a cryptographic accelerator (not shown). Computing device 204 is programmable to perform one or more operations described herein by programming memory 218 and/or processor 220. For example, processor 220 may be programmed by encoding an operation as executable instructions and providing the executable instructions in memory 218.

Processor 220 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 220, cause processor 220 to perform at least a portion of the functions described herein. The above examples are exemplary only, and thus are not intended to limit in any way the definition and/or meaning of the term processor.

Memory 218 is one or more devices that enable information such as executable instructions and/or other data to be stored and retrieved. Memory 218 may include one or more computer-readable media, such as, without limitation, dynamic random access memory (DRAM), synchronous dynamic random access memory (SDRAM), static random access memory (SRAM), a solid state disk, and/or a hard disk. Memory 218 may be configured to store, without limitation, executable instructions, operating systems, applications, resources, installation scripts and/or any other type of data suitable for use with the methods and systems described herein.

Instructions for operating systems and applications are located in a functional form on non-transitory memory 218 for execution by processor 220 to perform one or more of the processes described herein. These instructions in the different implementations may be embodied on different physical or tangible computer-readable media, such as memory 218 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from computing device 204 to permit access and/or execution by processor 220. In an alternative implementation, the computer-readable media is not removable.

Figure 4:
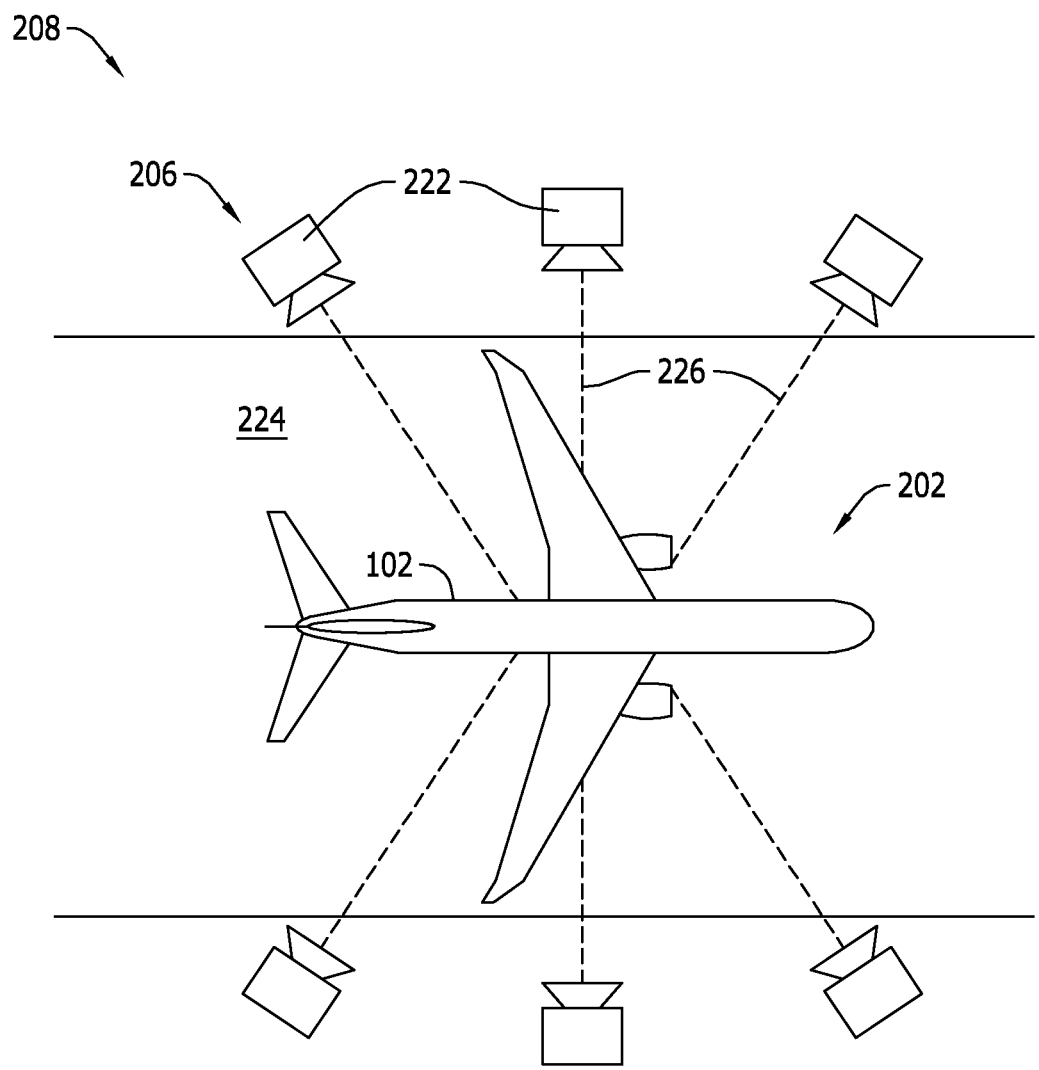
FIG. 4 is a schematic illustration of an exemplary array of visual imaging devices that may be used with the system shown in FIG. 3.

FIG. 4 is a schematic illustration of an exemplary array 206 of visual imaging devices 222 that may be used with system 200 (shown in FIG. 3). In the exemplary implementation, array 206 includes a plurality of visual imaging devices 222 positioned along a runway 224 at location 208, such as first location 212 or second location 216 (each shown in FIG. 3). More specifically, visual imaging devices 222 remain substantially stationary as object 202, such as aircraft 102, taxis along runway 224. Alternatively, visual imaging devices 222 remain substantially stationary relative to runway 224 and pivot about an axis of rotation (not shown) as aircraft 102 taxis along runway 224. Moreover, alternatively, visual imaging devices 222 are translatable relative to runway 224. Array 206 is oriented such that visual imaging devices 222 are capable of capturing a plurality of 2D images of aircraft 102 from a plurality of different orientations as aircraft 102 and array 206 translate relative to each other. As such, a first set of 2D images of aircraft 102 are captured over a first predetermined interval that are hereinafter referred to as the "reference set."

At a later time and/or date, a second set of 2D images of aircraft 102 are captured over a second predetermined interval that are hereinafter referred to as the "sensed set." More specifically, the sensed set of 2D images is captured by either the same array of visual imaging devices as the reference set, or is captured by a different array of visual imaging devices as the reference set at a different location from where the reference set was captured. For example, the reference set may be captured by first array 210 and the sensed set may be taken by second array 214 (each shown in FIG. 3), or the reference and sensed sets may both be captured by either first or second array 210 or 214. In either example, the 2D images in the sensed set are captured from different orientations than the 2D images in the reference set. A variety of factors will cause the 2D images from the sensed and reference sets to be captured from different orientations. Exemplary factors include, but are not limited to, an orientation of visual imaging devices 222 in first and second arrays 210 and 214, differing distances 226 between visual imaging devices 222 and aircraft 102 in the 2D images captured in the sensed and reference sets, an orientation of aircraft 102 relative to visual imaging devices 222 in the 2D images captured in the sensed and reference sets, the speed of aircraft 102 taxiing past array 206 over the first and second predetermined intervals, and/or differences in image capturing intervals. As such, the reference and sensed sets of 2D images represent several different views of aircraft 102.

Figure 5:
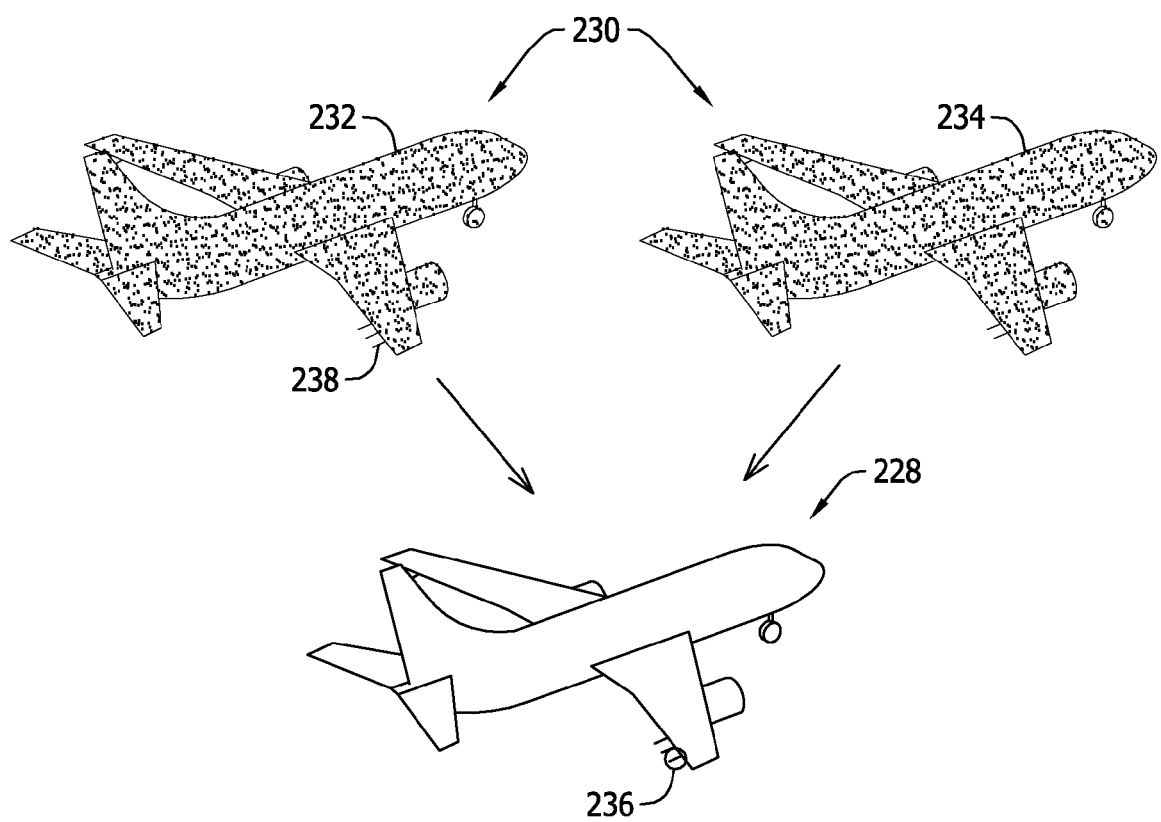
FIG. 5 is a schematic illustration of generating an exemplary three-dimensional model using the system shown in FIG. 3.

FIG. 5 is a schematic illustration of generating an exemplary three-dimensional (3D) model 228 using system 200. In the exemplary implementation, 3D model 228 is generated by extracting point clouds 230 of aircraft 102 from the 2D images of the reference set and the sensed set captured by visual imaging devices 222 (shown in FIG. 4). More specifically, a first point cloud 232 is extracted from the 2D images of the reference set, and a second point cloud 234 is extracted from the 2D images of the sensed set. The non-moving background of each 2D image in the reference set and the sensed set are removed such that only the image of aircraft 102 remains. Exemplary techniques for removing the non-moving background from each 2D image include, but are not limited to, an image subtraction technique, and a statistical method based on identifying and isolating changes between images captured over predetermined intervals. First and second point clouds 232 and 234 are then combined using a structure from motion (SfM) range imaging technique to generate 3D model 228.

As described above, the 2D images from the reference and sensed sets are captured from different orientations about aircraft 102. As such, fine registration of point clouds 232 and 234 from the reference and sensed sets, respectively, is performed when combining point clouds 232 and 234 to generate 3D model 228. Performing fine registration facilitates reducing a registration mismatch between point clouds 232 and 234. Exemplary techniques for performing fine registration include, but are not limited to, a general pattern matching technique, a normalized grayscale correlation, and an iterative closest point algorithm. Change detection is then performed to facilitate determining variations in point clouds 232 and 234, and to facilitate detecting the presence of potential anomalies 236 in 3D model 228. Exemplary techniques for performing change detection include, but are not limited to, a general pattern change technique, and an earth mover's distance technique.

In the exemplary implementation, change detection is performed on regions of interest on 3D model 228. More specifically, regions of interest are defined that correlate generally to areas on aircraft 102 that are susceptible to damage and the formation of potential anomalies 236 in 3D model 228. The image data from the reference set associated with the region of interest is then compared to the image data from the sensed set associated with the same region of interest. Potential anomalies 236 are detected in 3D model 228 when variations between portions of point clouds 232 and 234 in the region of interest are greater than a predetermined threshold. When potential anomalies 236 are detected, the region of interest is designated for further inspection. The further inspection may be completed manually by a maintenance worker, and/or by an automated inspection system (not shown).

In the exemplary implementation, potential anomaly 236 is a missing static discharge wick 238 from aircraft 102. Alternatively, potential anomalies 236 include, but are not limited to, faulty door latches (not shown), missing and/or loose components (not shown) on aircraft 102, fluid leaks, and/or smudges or streaks (not shown) on aircraft 102.

After potential anomalies 236 have been detected, inspected, and repaired, a second reference set of 2D images of aircraft 102 is captured to be compared against subsequent sensed sets of 2D images. Alternatively, the second reference set is captured after any significant change in the profile of aircraft 102. As such, the initial reference set of 2D images becomes obsolete after the performance of maintenance on aircraft 102 and/or after significant changes in the profile of aircraft 102 have occurred.

Figure 6:
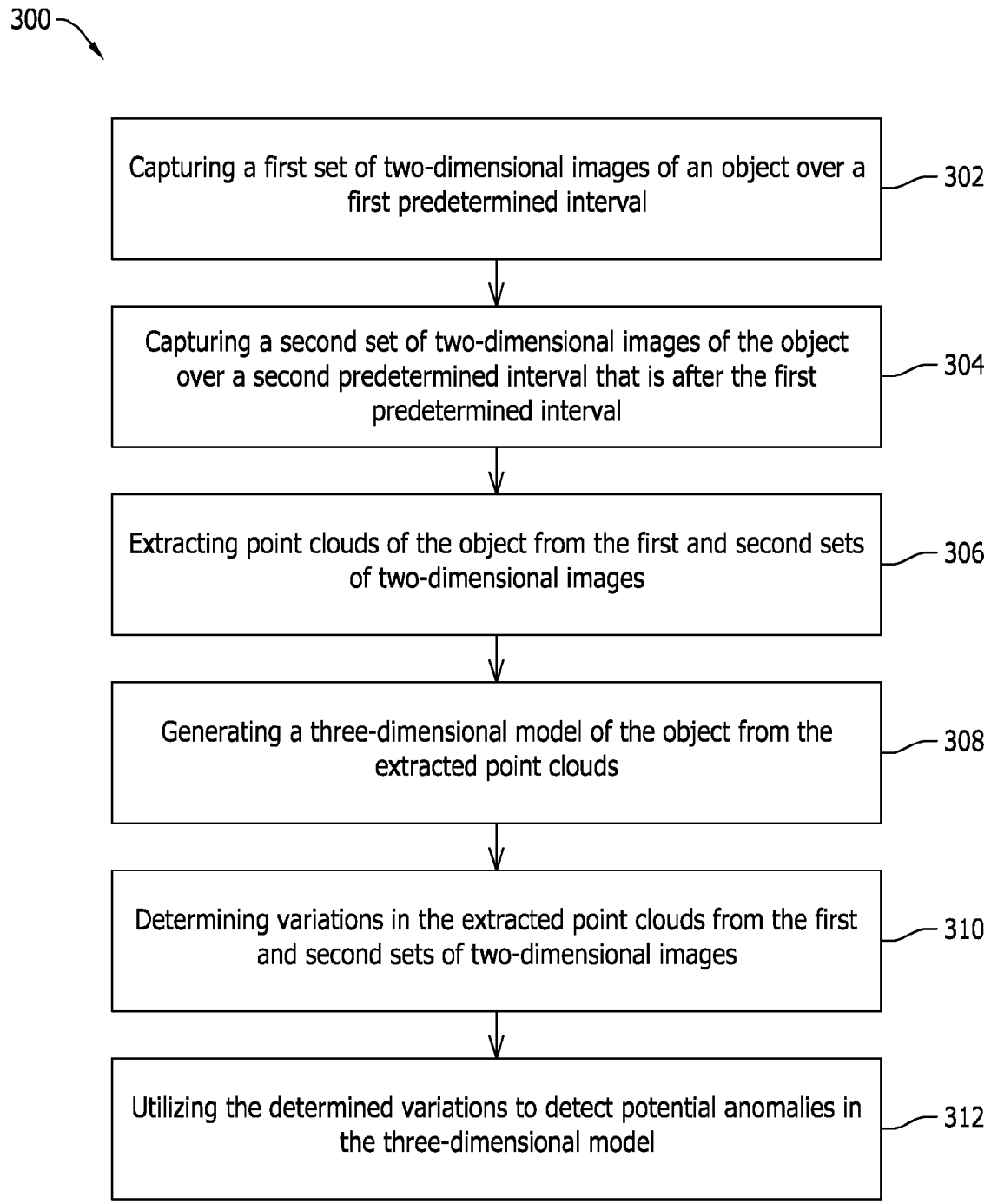
FIG. 6 is a flow diagram of an exemplary method of inspecting an object.

FIG. 6 is a flow diagram of an exemplary method 300 of inspecting object 202, such as aircraft 102. In the exemplary implementation, method 300 includes capturing 302 a first set of two-dimensional images of the object over a first predetermined interval, and capturing 304 a second set of two-dimensional images of the object over a second predetermined interval that is after the first predetermined interval. Method 300 also includes extracting 306 point clouds of the object from the first and second sets of two-dimensional images, and generating 308 a three-dimensional model of the object from the extracted point clouds. Variations in the extracted point clouds are then determined 310 and utilized 312 to detect potential anomalies in the three-dimensional model.

The implementations described herein facilitate detecting potential damage on an object being inspected. More specifically, a 3D model of the object is generated from a reference set and a sensed set of 2D images using structure from motion range imaging techniques. Image data from the reference and sensed sets of 2D images are compared to determine the presence of potential anomalies in the 3D model. Regions of the aircraft having the potential anomalies defined therein are then designated for further inspection by a maintenance worker, for example. As such, the maintenance worker is provided with areas of the object that may require closer scrutiny during visual inspection, thus facilitating reducing the time required for manual inspection of the object.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in inspecting an object, said system comprising:
   at least one array of visual imaging devices configured to capture a plurality of two-dimensional images of the object, wherein the object is configured to translate relative to said at least one array, said at least one array configured to capture a first set of two-dimensional images over a first predetermined interval and a second set of two-dimensional images over a second predetermined interval that is after the first predetermined interval; and
   a computing device coupled to said at least one array of visual imaging devices, said computing device comprising a processor and a memory having computer-executable instructions stored thereon, wherein, when executed by said processor, the computer-executable instructions cause said processor to:
      determine moving portions and non-moving portions in the plurality of two-dimensional images;
      extract point clouds of the object from the first and second sets of two-dimensional images, wherein the point clouds include the moving portions in the plurality of two-dimensional images;
      generate a three-dimensional model of the object from the extracted point clouds;
      determine variations in the extracted point clouds from the first and second sets of two-dimensional images; and
      utilize the determined variations to detect potential anomalies in the three-dimensional model.

2. The system in accordance with claim 1, wherein the computer-executable instructions further cause said processor to:
   define regions of interest on the three-dimensional model; and
   extract portions of the point clouds of the object from the first and second sets of two-dimensional that correspond to the regions of interest.

3. The system in accordance with claim 2, wherein the computer-executable instructions further cause said processor to determine when variations between the portions of the point clouds in the regions of interest are greater than a predetermined threshold.

4. The system in accordance with claim 1, wherein the computer-executable instructions further cause said processor to perform a fine registration of the point clouds of the object from the first and second sets of two-dimensional images.

5. The system in accordance with claim 1, wherein the computer-executable instructions further cause said processor to perform change detection of the point clouds of the object from the first and second sets of two-dimensional images.

6. The system in accordance with claim 1, wherein the computer-executable instructions further cause said processor to designate regions of the object for further inspection when a potential anomaly is detected in the three-dimensional model.

7. The system in accordance with claim 1, wherein said at least one array of visual imaging devices comprises a first array at a first location and a second array at a second location, wherein the object is selectively moveable between the first and second locations.

8. A method of inspecting an object, said method comprising:
   capturing, with at least one array of visual imaging devices, a first set of two-dimensional images of the object over a first predetermined interval, wherein the object is configured to translate relative to the at least one array;
   capturing, with the at least one array of visual imaging devices, a second set of two-dimensional images of the object over a second predetermined interval that is after the first predetermined interval;
   determining moving portions and non-moving portions in the plurality of two-dimensional images;
   extracting point clouds of the object from the first and second sets of two-dimensional images, wherein the point clouds include the moving portions in the plurality of two-dimensional images;
   generating a three-dimensional model of the object from the extracted point clouds;
   determining variations in the extracted point clouds from the first and second sets of two-dimensional images; and
   utilizing the determined variations to detect potential anomalies in the three-dimensional model.

9. The method in accordance with claim 8 further comprising capturing at least one image of the first set of two-dimensional images at a different orientation than images in the second set of two-dimensional images.

10. The method in accordance with claim 8, wherein extracting point clouds of the object comprises:
    defining regions of interest on the three-dimensional model; and
    extracting portions of the point clouds of the object from the first and second sets of two-dimensional that correspond to the regions of interest.

11. The method in accordance with claim 10, wherein determining variations in the point clouds comprises determining when variations between the portions of the point clouds in the regions of interest are greater than a predetermined threshold.

12. The method in accordance with claim 8, wherein generating a three-dimensional model of the object comprises performing a fine registration of the point clouds of the object from the first and second sets of two-dimensional images.

13. The method in accordance with claim 8, wherein determining variations in the extracted point clouds comprises performing change detection of the point clouds of the object from the first and second sets of two-dimensional images.

14. The method in accordance with claim 8, wherein utilizing the determined variations comprises designating regions of the object for further inspection when a potential anomaly is detected in the three-dimensional model.

15. A non-transitory computer-readable storage device having computer-executable instructions embodied thereon for use in inspecting an object, wherein, when executed by a computing device, the computer-executable instructions cause the computing device to:
    determine moving portions and non-moving portions in a plurality of two-dimensional images of the object, wherein the plurality of two-dimensional images include a first set of two-dimensional images and a second set of two-dimensional images taken over separate predetermined intervals;

extract point clouds of the object from the first set and the second set of two-dimensional images, wherein the point clouds include the moving portions in the plurality of two-dimensional images;

generate a three-dimensional model of the object from the extracted point clouds;

determine variations in the extracted point clouds from the first and second sets of two-dimensional images; and utilize the determined variations to detect potential anomalies in the three-dimensional model.

16. The non-transitory computer readable medium in accordance with claim 15 further comprising computer-executable instructions that cause the computing device to:

define regions of interest on the three-dimensional model; and extract portions of the point clouds of the object from the first and second sets of two-dimensional that correspond to the regions of interest.

17. The non-transitory computer readable medium in accordance with claim 16 further comprising computer-executable instructions that cause the computing device to determine when variations between the portions of the point clouds in the regions of interest are greater than a predetermined threshold.

18. The non-transitory computer readable medium in accordance with claim 16 further comprising computer-executable instructions that cause the computing device to perform a fine registration of the point clouds of the object from the first and second sets of two-dimensional images.

19. The non-transitory computer readable medium in accordance with claim 16 further comprising computer-executable instructions that cause the computing device to perform change detection of the point clouds of the object from the first and second sets of two-dimensional images.

20. The non-transitory computer readable medium in accordance with claim 16 further comprising computer-executable instructions that cause the computing device to designate regions of the object for further inspection when a potential anomaly is detected in the three-dimensional model.

* * * * *